Aug. 25, 1959 A. WIEBERDINK 2,901,560

AMPLIFIER FOR A WIDE FREQUENCY BAND MORE PARTICULARLY VIDEO FREQUENCY AMPLIFIERS

Filed Aug. 29, 1955

INVENTOR

ATE WIEBERDINK

BY Fred M. Vogel

AGENT

United States Patent Office
2,901,560
Patented Aug. 25, 1959

2,901,560

AMPLIFIER FOR A WIDE FREQUENCY BAND MORE PARTICULARLY VIDEO FREQUENCY AMPLIFIERS

Ate Wieberdink, Eindhoven, Netherlands, assignor, by mesne assignments, to North American Philips Company, Inc., New York, N.Y., a corporation of Delaware Application August 29, 1955, Serial No. 531,078

Claims priority, application Netherlands September 14, 1954

2 Claims. (Cl. 179—171)

The invention relates to an amplifier for a wide frequency band, more particularly to a video-frequency amplifier, comprising a tube having at least one cathode, one input control-grid and one anode, in which the amplified oscillations are obtained from an anode resistor.

It is known to improve the frequency characteristic curve of video amplifiers by connecting a coil in series with the anode resistor.

Figure 1:
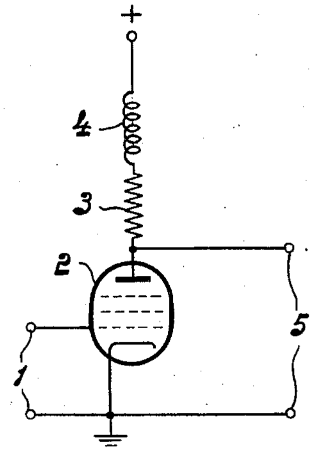

Fig. 1 shows such an arrangement. In this figure the input terminals are designated by 1, the pentode used as an amplifier is designated by 2, the anode resistor by 3 and the coil connected in series herewith by 4 and the output terminals are designated by 5.

The invention has for its object to provide the possibility to adjust the frequency characterisic curve of such an amplifier at will, without the need for varying the inductance of the coil.

To this end use is made of a push-pull connection. The invention consists in that the coils included in the anode leads of the two tubes of the push-pull amplifier are coupled with one another. This coupling is preferably made variable, for example by arranging the coils so as to be slidable with respect to one another on a common former.

In each coil not only the electromotive force of the inductance, but also an electromotive force of the relative inductance will occur, this inductance being, of course, derived from the same signal.

The effective inductance prevailing in each anode circuit may be readily varied by varying the coefficient of the relative inductance.

The coils are preferably wound on a common former in a manner such that the external fields which they produce in response to the signal current will counteract one another. The total external field is then small, so that the influence exerted on other circuits and the influence of the screening are small. The inductances of the coils are, in this case, chosen to be slightly too high first and then, by varying the relative coupling they are adjusted to the correct value.

Figure 2:
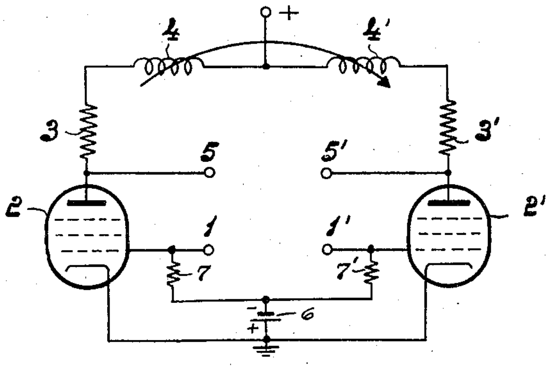

Fig. 2 shows an amplifier according to the invention. It comprises two arrangements of the kind shown in Fig. 1, having input terminals 1, 1′ and output terminals 5, 5′, provision being made of a particular variable coupling between the coils 4 and 4′. A positive potential, for operating the tubes 2 and 2′, is connected to the junction of the coils 4 and 4′, and electrical ground or other reference potential is connected to the cathodes of the tubes 2, 2′. A source 6 of bias potential is connected to the grids of the tubes 2 and 2′ by means of resistors 7 and 7′, respectively. In the circuit shown, if a push-pull input signal is applied to the input terminals 1 and 1′, then a push-pull output signal will appear at the output terminals 5 and 5′.

What is claimed is:

1. A wide-band amplifier comprising a pair of electron-discharge devices each having at least a cathode, a control electrode and an output electrode, a first series combination of a resistor and an inductor connected at an end thereof to the output electrode of one of said devices, a second series combination of a resistor and an inductor connected at an end thereof to the output electrode of the other of said devices, means for supplying an operating voltage to the remaining ends of said series combinations, means for applying a reference potential to both of said cathodes, means for applying a push-pull input signal to said control electrodes whereby a push-pull output signal is produced in said first and second series combinations thereby causing external fields to be produced by said inductors, and means for providing electrical coupling between said inductors to cause said external fields to counteract one another.

2. An amplifier as claimed in claim 1, in which the inductor and resistor of each of said series combinations are relatively positioned so that said resistors are at the ends of the series combinations which are connected to said output electrodes and said inductors are at the remaining ends of the series combinations to which said operating voltage is supplied, and including means for varying said electrical coupling between the inductors.

References Cited in the file of this patent

UNITED STATES PATENTS

| | | |
|---|---|---|
| 2,462,903 | Romander | Mar. 1, 1949 |
| 2,510,683 | Carpentier | June 6, 1950 |
| 2,673,253 | James | Mar. 23, 1954 |
| 2,691,075 | Schwartz | Oct. 5, 1954 |
| 2,698,922 | Reise | Jan. 5, 1955 |
| 2,702,837 | Easton | Feb. 22, 1955 |
| 2,787,672 | Crosby | Apr. 2, 1957 |
| 2,802,069 | Weber | Aug. 6, 1957 |